United States Patent

Mohon et al.

[11] 3,724,933
[45] Apr. 3, 1973

[54] LASER SPECKLE VISUAL TESTER

[75] Inventors: Windell N. Mohon, Winter Park; Alfred N. Rodemann, Maitland, both of Fla.

[73] Assignee: The United States of America as represented by the Secretary of the Navy

[22] Filed: Sept. 8, 1971

[21] Appl. No.: 178,584

[52] U.S. Cl. .................................................351/36
[51] Int. Cl. ...............................................A61b 3/02
[58] Field of Search.........................................351/36

[56] References Cited

UNITED STATES PATENTS 3,572,912  3/1971  Knoll.....................................351/36

OTHER PUBLICATIONS

D. Sinclair, "Demonstration of Chromatic Aberration. . . Coherent Light," JOSA, Vol. 55, pp. 575 & 576, June, 1965.

"Sparkling Spots & Random Diffraction," Proceedings of IEEE, B. Oliver, Vol. 51, January 1963, pp. 220–221.

J. Rigden et al., "The Granularity. . . Maser Light," Proceedings of IRE, Vol. 50, November 1962, pp. 2,367–2,638.

*Primary Examiner*—Ronald L. Wibert
*Assistant Examiner*—Paul A. Sacher
*Attorney*—Richard S. Sciascia et al.

[57] ABSTRACT

Large groups of persons may be simultaneously tested for nearsightedness and farsightedness by use of a laser speckle pattern formed by projecting a laser beam onto a surface. A speckle pattern is projected on a surface and either the surface or the beam is moved with respect to the other. The direction of apparent motion of the pattern observed by a subject indicates the presence of myopia or hyperopia.

1 Claim, 2 Drawing Figures

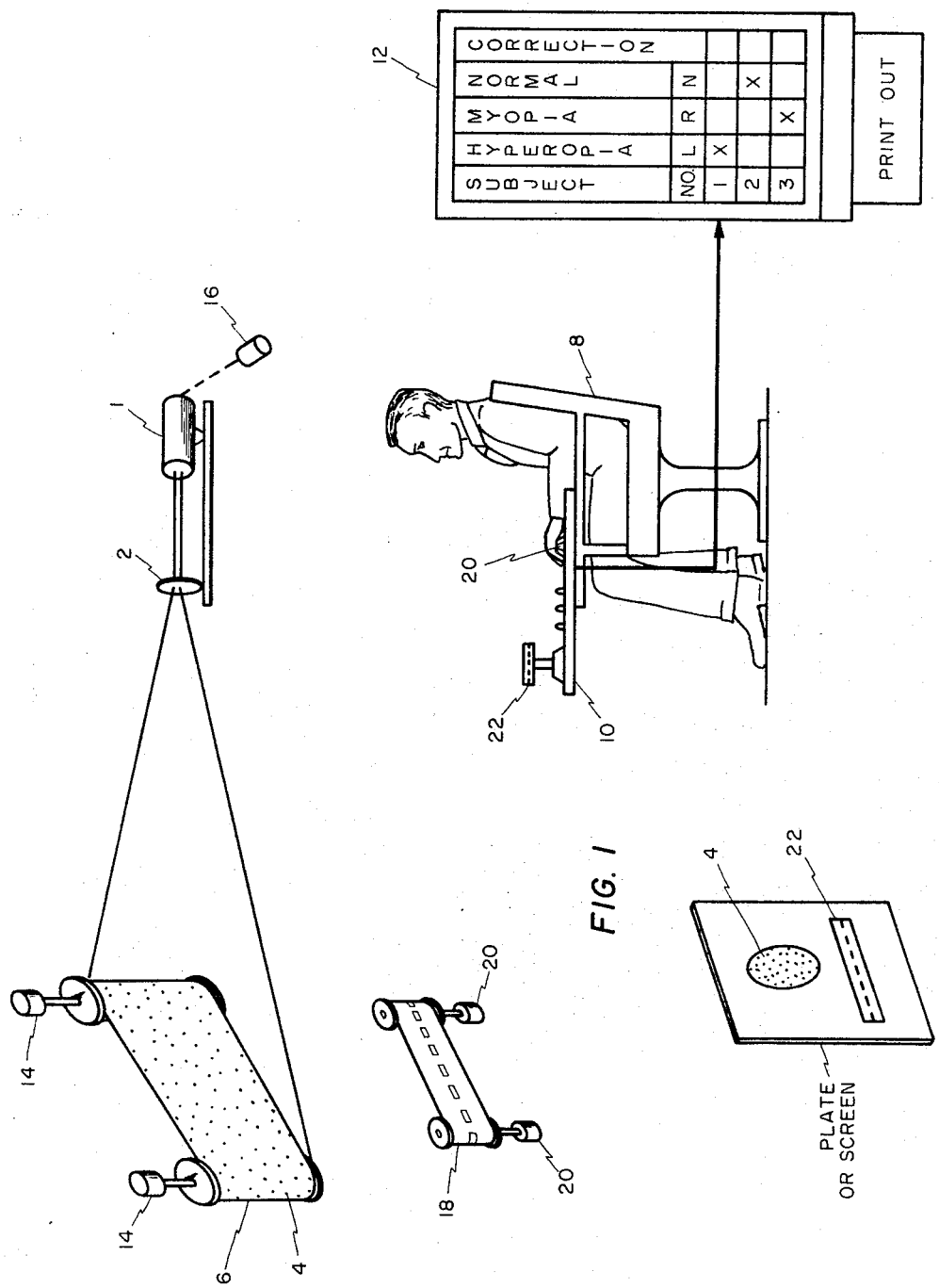

LASER SPECKLE VISUAL TESTER

BACKGROUND OF THE INVENTION

The invention is in the field of visual testing methods and apparatus, and is related to laser apparatus. In the prior art practice, visual acuity tests are made by asking a subject being tested if he can see a particular line of print on a standard chart. The subject must make a judgment as to how clear the print should appear for correct vision. The invention eliminates the need for the subject to exercise judgment as to the clarity of the print.

SUMMARY OF THE INVENTION

Laser apparatus is provided for projecting a laser speckle pattern on a suitable surface. A subject whose visual acuity is being tested observes the speckle pattern on the surface with one eye at a time. The subject moves his head or the surface is moved in a designated direction. If hyperopia or myopia is present, the subject can observe apparent movement of the speckle pattern. The speed of the pattern movement apparent to the subject can be measured to determine the degree of any myopic or hyperopic condition present and the optical correction required for each eye.

DESCRIPTION OF THE DRAWINGS

FIG. 1 shows apparatus for practicing the invention;
FIG. 2 shows an alternate embodiment of means for determining pattern speed.

DESCRIPTION OF THE PREFERRED EMBODIMENT

As shown in FIG. 1, a low power (e.g., 1 milliwatt) laser beam from a laser 1 is passed through a lens system 2 which diverges the beam to a comfortable viewing size. The diverged beam forms a laser speckle pattern 4 comprising a great number of small dots on a surface 6. The size and number of dots in the pattern is a function of the smoothness of surface 6. A station 8 is located at a convenient viewing distance (usually greater than 1 meter) from surface 6. A subject whose visual acuity is being tested is located at station 8. The station is shown as a chair in the drawing; however, it is not necessary that a subject be seated. Station 8 may be nothing more than a discrete location. A plurality of stations may be provided so that a plurality of subjects may be tested simultaneously. A transmitter 10 may be provided for the subject to use to signal any apparent movement of the speckle pattern to an indicator 12. Transmitter 10 is shown as a push button board bearing three buttons labeled "Left," "Right," and "None," respectively. Any suitable transmitter would serve. Indicator 12 may be a standard indicating device placed at a convenient location and which responds to signals from transmitter 10 to indicate the particular button pressed by each subject. Indicator 12 may print out test results in a known manner. A surface moving means 14 is provided for moving surface 6 at a selected speed in a selected direction. Means 14 is actuated by controls not shown.

The invention is based on the discovery that if surface 6 is moved, say laterally to the right or left, the speckle pattern 4, that is, the great numbers of individual specks or dots, comprising the pattern, will appear to move in one direction to a subject at station 8 who is nearsighted (myopic) and will appear to move in the opposite direction to a person who is farsighted (hyperopic). The speed at which the speckle pattern appears to move is a measure of the degree of the subject's condition. If the speckle pattern does not appear to move when surface 6 is moved, the subject has normal vision.

Surface moving means 14 is shown as a pair of reversible speed controlled motors for driving two drums on which surface 6 (shown as a wide belt) is wound. Means 14 can be controlled as to direction and speed by an operator. When a subject or group of subjects are positioned at stations 8, the operator causes surface 6 to move to the right or left at a selected speed. The subjects observe the speckle pattern with one eye and depress one of the buttons marked "Left," "Right," or "None" on the respective transmitters 10, depending on whether the pattern appears to move and on the direction in which it appears to move.

If a subject observes no motion, he depresses the button marked "None" which will cause a mark to appear in the "Normal" column adjacent the subject's number on indicator 12. The subject's other eye is then tested in a like manner. The stations 8 are numbered to identify the subjects and a signal from the transmitter at a particular station will register in one of the "L," "R," or "N" columns adjacent that number on indicator 12.

Relative motion between surface 6 and speckle pattern 4 can also be achieved by operating a laser and lens sweeping means 16 to move the speckle pattern across the surface. If this is done, the direction of apparent movement of the speckle pattern will appear to the subject to be reversed relative to the direction observed when the surface is the element being moved.

Since speed at which the speckle pattern appears to move (considered with respect to the speed of relative movement between surface 6 and the pattern 4) is a measure of a subject's visual disability, a "speed standard" correlating means is shown as a roller mounted belt 18 positioned adjacent to surface 6. When a subject observes apparent movement of the speckle pattern, he may operate a control such as a reversing switch and speed control 20 at transmitter 10 to activate reversible speed controlled motors 20 to move belt 18 in the same direction and at the same speed as the apparent speckle pattern movement, through connections not shown. This direction and speed signal will register in the right hand column of indicator 12, which may be calibrated to indicate the optical correction required. If a group of subjects are being tested simultaneously, it may be preferable to provide individual speed correlating means such as a rotating reversible speed controlled drum 22 as a speed standard for each station in lieu of a single belt 18. Drums 22 may be controlled by controls 20 and are positioned so that drum and speckle pattern may be observed simultaneously by a subject. Drum 22 and belt 18 are appropriately marked with dots, dashes, or other patterns. A fixed marker (not shown) adjacent drum 22 or belt 18 may be provided to aid in perceiving motion and speed, if required.

The embodiment shown is by way of example only. Belts 18 and 6 could be replaced with drums or disks. A rotatable mirror could be used to sweep the laser beam across a surface instead of moving the laser as shown. Indicator 12 could be comprised of a single "correction" column or two correction columns adjacent the subject number column, one column for a subject's left eye and one column for the right eye. Instead of using a movable surface or beam, relative movement could be achieved by having the subject turn his head. However, the results would not be uniform between subjects because of individual differences in head or eye movements.

Most subjects can adjust the speed of a speed standard, such as drum 22, to match the speed of the apparent motion of the speckle pattern readily. However, the invention envisions any of several expedients to make the speed correlation operation somewhat easier. Each station may be shielded by a plate having a restricted viewing window through which the speckle pattern is observed. A speed standard such as drum 22 or a moving train of lights such as sign or theater marquee lights, or other markings, could be made viewable through a slot in the plate which is immediately adjacent the viewing window. If considered desirable, the speckle pattern may be directed optically to an individual front-lighted screen or translucent back-lighted screen at each station. A suitable speed standard is observable adjacent the screen or through an opening in the screen. FIG. 2 illustrates such a plate or screen to be attached to each station. Alternatively, a separate movable surface and laser, or surface and movable laser beam, can be provided for each station. Moving means for all stations can be synchronized to insure uniform movement at all stations.

The invention effects a great savings in time and effort, especially when testing groups of subject, i.e., groups of service inductees, students, applicants for drivers licenses, etc. It can be used to test the eyes of animals, for example experimental animals used in medical and scientific research, where reading a line or print is clearly impossible. The invention can be operated in such a way as to apprehend "cheaters." The operator can insert lenses of different known values in the system when testing successive groups. The readings can be corrected accordingly; but information transmitted from one group to a following group would not enable a subject in the following group to "cheat." The invention would prevent cheating by persons with defective vision who might memorize an optical chart.

We claim

1. In apparatus for testing visual acuity, the improvement comprising:
    a laser for projecting a laser beam,
    a lens system for diverging said laser beam,
    a surface positioned so that a laser beam from said laser and lens system forms a speckle pattern on said surface,
    a station where a subject being tested for visual acuity is positioned at a convenient viewing distance from said speckle pattern,
    pattern moving means for causing relative movement between said speckle pattern and a patient's eyes,
    transmitter signaling means at said station and indicating means for receiving signals from said transmitter signaling means,
    said pattern moving means including speed adjusting means for moving said surface at selected speeds,
    a speed standard,
    adjusting means at said transmitter for adjusting the speed of said standard to match the speed of speckle pattern motion apparent to the subject, and speed indicating means for indicating the speed of said speed standard,
    said indicating means being calibrated to convert said speed standard indication into an optical correction indication,
    said transmitter comprising
    a reversing switch,
    a speed control for said adjusting means,
    a right direction button switch,
    a left direction button switch,
    a no movement button switch,
    said indicating means comprising
    a print out means for printing in a normal column in response to closure of said no movement switch, in a hyperopia column in response to closure of said left direction switch, in a myopia column in response to closure of said right direction switch, and in a subject number column,
    said apparatus including cheater detection means for inserting lens of various known values in the system to preclude cheating by subjects with defective vision.

* * * * *